US007825355B2

(12) United States Patent
Suzuki et al.

(10) Patent No.: US 7,825,355 B2
(45) Date of Patent: Nov. 2, 2010

(54) CERAMIC BLOCK WITH BUILT IN ELECTRODE AND METHOD OF MANUFACTURE THEREOF

(75) Inventors: Shigemi Suzuki, Ishikawa (JP); Kazuyuki Deguchi, Ishikawa (JP); Yoshiharu Ishimi, Ishikawa (JP)

(73) Assignee: Sodick Co., Ltd., Yokohama, Kanagawa (JP)

( * ) Notice: Subject to any disclaimer, the term of this patent is extended or adjusted under 35 U.S.C. 154(b) by 841 days.

(21) Appl. No.: 10/590,360

(22) PCT Filed: Jun. 21, 2005

(86) PCT No.: PCT/JP2005/012255

§ 371 (c)(1), (2), (4) Date: May 14, 2007

(87) PCT Pub. No.: WO2005/122701

PCT Pub. Date: Dec. 29, 2005

(65) Prior Publication Data

US 2007/0286985 A1 Dec. 13, 2007

(30) Foreign Application Priority Data

Jun. 21, 2004 (JP) ............................ 2004-182505

(51) Int. Cl.
*H05B 3/16* (2006.01)
*C03B 29/00* (2006.01)

(52) U.S. Cl. ....................... 219/543; 219/542; 219/548; 428/119; 428/336; 428/668; 156/89.12; 427/58

(58) Field of Classification Search ............. 219/542-3, 219/548; 428/119, 336, 688; 156/89.12; 427/58
See application file for complete search history.

(56) References Cited

U.S. PATENT DOCUMENTS 6,486,542 B1 11/2002 Ohashi et al.
2003/0044653 A1 3/2003 Hiramatsu et al.

FOREIGN PATENT DOCUMENTS

JP 62-264638 11/1987
JP 11-74336 3/1999
JP 2000-106391 4/2000
JP 2001-296269 10/2001
JP 2001-345372 12/2001
JP 2002-141403 * 5/2002
JP 2003-115529 4/2003
JP 2004-168658 6/2004

* cited by examiner

*Primary Examiner*—Shawntina Fuqua
(74) *Attorney, Agent, or Firm*—McDermott Will & Emery LLP

(57) ABSTRACT

A ceramic block with a built in electrode, including a first insulating ceramic sheet having a bearing surface, a sheet electrode having an inner edge and extending generally parallel to the bearing surface, a second insulating ceramic sheet disposed to enclose the sheet electrode between the second insulating ceramic sheet and the first insulating ceramic sheet, and a cylindrical, thin film shaped drawn-out conductor perpendicularly connected to the inner edge of the sheet electrode to supply voltage to the sheet electrode. The drawn-out conductor is attached to the inner wall of a through hole of the second insulating ceramic sheet, and an insulating ceramic shaft is packed into the through hole.

18 Claims, 2 Drawing Sheets

CERAMIC BLOCK WITH BUILT IN ELECTRODE AND METHOD OF MANUFACTURE THEREOF

FIELD OF THE INVENTION

The present invention relates to a ceramic block with a sheet electrode built in, used in a ceramic electrostatic chuck or a ceramic heater.

BACKGROUND ART

A ceramic block with a built in electrode has a flat bearing surface in which a glass substrate is mounted for a semiconductor wafer or LCD (liquid crystal display). The ceramic block is formed by firing laminated insulation ceramic sheets. A sheet electrode spreading out parallel to the bearing surface is fitted between the laminated ceramic sheets. The sheet electrode may be the form of a metallized layer plated on a film, mesh or ceramic sheet. Normally, a hole extending from the opposite side of the bearing surface to the sheet electrode is provided in the ceramic block. A drawn out conductor for supplying voltage to the sheet electrode passes through the hole and connects to an external electrode of the ceramic block.

Japanese patent Publication No. 62-264638 discloses an electrostatic chuck platform, as a ceramic block with a built in electrode. An insertion hole is formed in the electrostatic chuck platform, on the opposite side to the bearing surface, and an external electrode is fixed into the insertion hole. A plurality of connector holes connecting a sheet electrode with the insertion hole are formed, and conductive paste is filled into the connector holes. Voltage is applied through the external electrode and the conductive paste.

Japanese patent Publication No. 2001-296269 discloses a ceramic heater for an oxygen sensor, as a ceramic block with a built in electrode. The ceramic heater has a resistance heating element patter, as a sheet electrode, and a plurality of ceramic insulating layers. A number of through holes having a metallic film plated on an inner surface are formed in the ceramic heater. A number of electrode terminal sections are exposed on an outer surface of the ceramic insulation layer, and pass through the through holes to extend towards the electrodes. Plate shaped conductors (lead lines) are pressure bonded to the exposed electrode terminal sections using a ring clasp.

Japanese patent Publication No. 2000-106391 discloses an insulating ceramic base for a susceptor for supporting a semiconductor, as a ceramic block with a built in electrode. A locating hole is formed in the ceramic base, at an opposite side to the bearing surface. Part of a mesh electrode within the ceramic base is exposed to the bottom of the locating hole. A terminal for supplying voltage to the mesh electrode is located in the locating hole. Before heat treatment of the ceramic base, an intermediate material is provided between the bottom of the locating hole and the terminal. The intermediate material is composed of a conductive metal matrix-ceramics complex, and is fused by heat treatment of the ceramic base. As a result, the terminal is electrically connected to the mesh electrode, and joined to the ceramic base.

Japanese patent Publication No. 2003-115529 discloses an electrostatic chuck unit, as a ceramic block with a built in electrode. The electrostatic chuck unit comprises insulating layers where the bearing surface is formed, and a conductive layer which spreads across the insulating layers, namely an electrode. The insulating layers are laminated on a metal foundation formed with a through hole. An insulating member is provided in the through hole, and a guide hole is formed in the insulating member. A conductor extends within the guide hole, with one end of the conductor being fixed to the conductive layer with solder, and the other end being fixed to a feed terminal with solder.

In order to improve the adsorption force of the electrostatic chuck and the thermal responsiveness of the ceramic heater, it is preferable to make the distance from the bearing surface to the sheet electrode smaller. Generally, a ceramic sheet where a bearing surface is formed has a thickness of 50-500 μm taking into consideration dielectric strength and mechanical strength. The ceramic sheet and the sheet electrode are different in their coefficients of thermal expansion and thermal contraction, respectively. Therefore, high residual stress arises at connecting sections of the sheet electrode and the drawn out conductor and it becomes easy for cracking to arise in the thin ceramic sheet and the sheet electrode.

It is desirable to provide a ceramic block with a built in electrode whereby it is difficult for cracking to arise in a thin ceramic sheet where a bearing surface is formed and in a sheet electrode, and also to provide a manufacturing method for such a ceramic block.

SUMMARY OF THE INVENTION

In one embodiment of the present invention, a ceramic block with a built in electrode includes a first insulating ceramic sheet having a bearing surface, a sheet electrode having an inner edge and extending generally parallel to the bearing surface, a second insulating ceramic sheet disposed to enclose the sheet electrode between the second insulating ceramic sheet and the first insulating ceramic sheet, and a drawn-out conductor for supplying voltage to the sheet electrode, the drawn-out conductor extending through the second insulating ceramic sheet and being connected to the inner edge of the sheet electrode.

Preferably, the drawn-out conductor is a cylindrical thin film, and is connected to the sheet electrode so that the drawn-out conductor is perpendicular to the sheet electrode.

As a result, residual stress arising at sections where the sheet electrode and the drawn-out conductor connect is distributed, thereby making it difficult for cracking to occur in a thin ceramic sheet and a sheet electrode.

In another embodiment, the invention is a method of manufacturing a ceramic block with a built in electrode, comprising the steps of forming a first insulating ceramic sheet having a bearing surface, forming a second insulating ceramic sheet having a through hole, forming a sheet electrode on the surface of at least one of the first and second insulating ceramic sheets and extending generally parallel to the bearing surface, forming a drawn-out conductor on an inner wall of the through hole, forming a laminated body comprising the first and second insulating ceramic sheets, and firing the laminated body comprising the first and second insulating ceramic sheets.

DETAILED DESCRIPTION OF THE INVENTION

Figure 1:
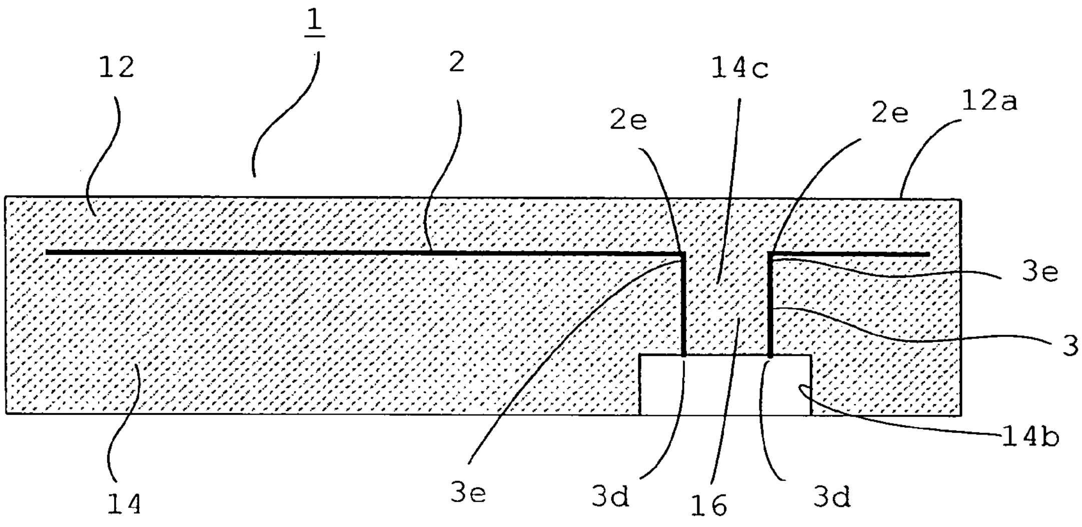
FIG. 1 is a cross sectional drawing of a ceramic block with a built in electrode of the present invention.
Figure 2:
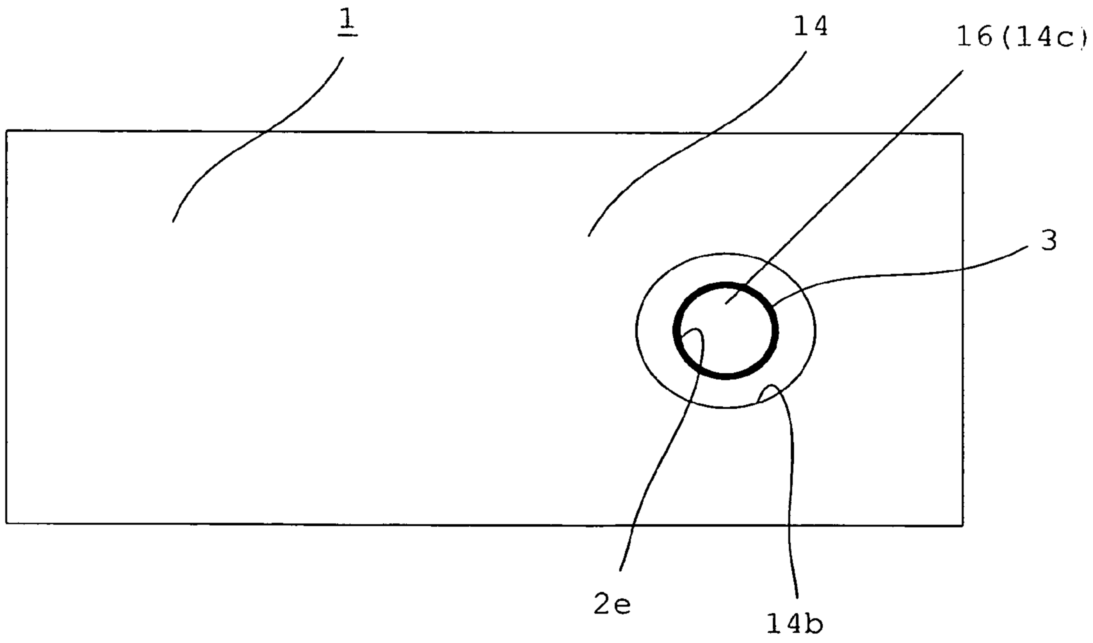
FIG. 2 is a plan view of the ceramic block with a built in electrode of FIG. 1 looking from below.
Figure 3:
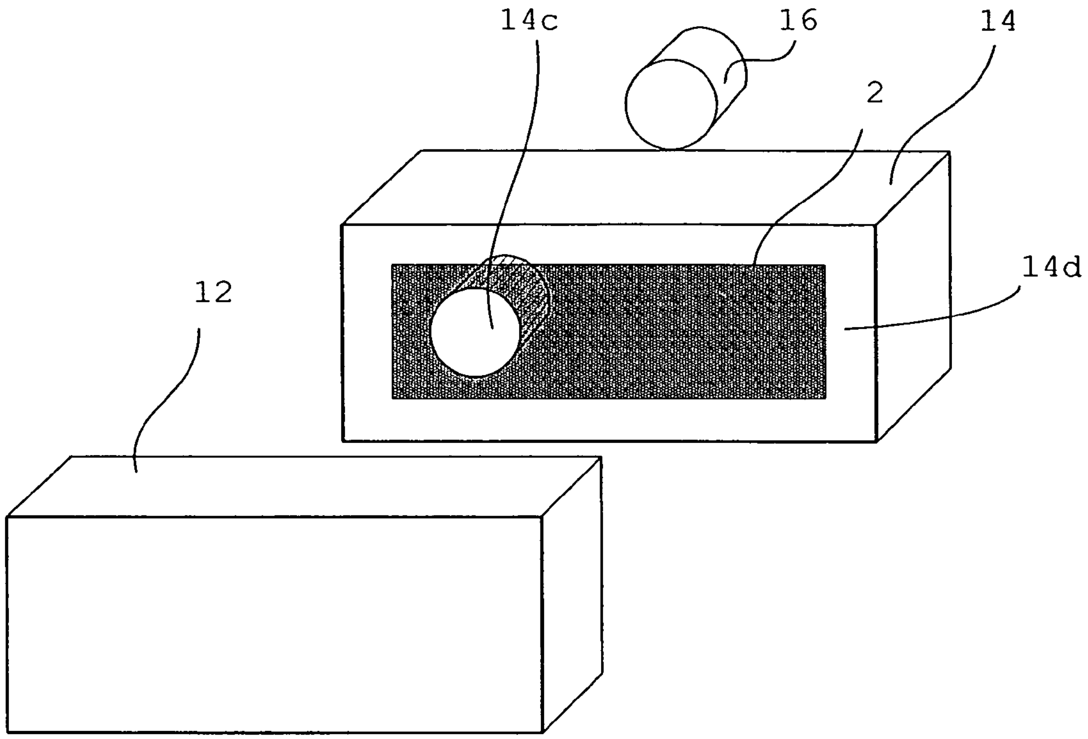
FIG. 3 is a perspective view showing a manufacturing method of the ceramic block with a built in electrode of FIG. 1.

A ceramic block with a built in electrode of the present invention, and a method manufacturing such a ceramic block, will now be described in detail with reference to FIG. 1, FIG. 2 and FIG. 3.

The ceramic block with a built in electrode 1 comprises rectangular ceramic sheets 12, 14 that have been laminated. A bearing surface 12*a* for holding a wafer or a substrate is formed on an upper surface of the first ceramic sheet 12. An expansion hole 14*b* for insertion of an external electrode (not shown) is formed in a bottom surface of the second ceramic sheet 14. A through hole 14*c* is formed running from the upper surface of the second ceramic sheet 14 to the expansion hole 14*b*. As is shown clearly in FIG. 2, the through hole 14*c* has a concentric circular cross section smaller than the expansion hole 14*b*. The ceramic block 1 has a thin film shaped sheet electrode 2 having a thickness of 2-150 μm between the ceramic sheets 12, 14. As shown clearly in FIG. 1, the sheet electrode 2 extends generally parallel to the bearing surface 12*a*. As shown clearly in FIG. 3, a circular hole aligned with an opening of the through hole 14*c* is formed in the sheet electrode 2. The sheet electrode 2 has a rectangular outer edge, and a circular inner edge 2*e* along the opening of the through hole 14*c*. The ceramic block 1 also comprises a tubular drawn-out conductor 3 for supplying voltage to the sheet electrode 2. The thin film shaped drawn-out conductor 3 has a thickness of 2-150 μm. The drawn-out conductor 3 is attached to an inner wall of the through hole 14*c* and has a cylindrical shape. A lower end 3*d* of the tubular drawn-out conductor 3 is exposed inside the expansion hole 14*b*. An upper end 3*e* of the drawn-out conductor 3 is connected to the inner edge 2*e* of the sheet electrode 2, and the drawn out-conductor 3 and the sheet electrode 2 form a perpendicular corner along the opening of the through hole 14*c*. A cylindrical ceramic shaft 16 is packed into the through hole 14*c*. The ceramic shaft 16 and the ceramic sheets 12, 14 are preferably made from the same material.

The ceramic sheets 12, 14 are made by compression molding of ceramic powder with added sintering agent using a mold. The ceramic shaft 16 is also similarly formed by compression molding. The dimensions of the through hole 14*c* of the second ceramic sheet 14 are designed taking into consideration power supplying capacity of the drawn out conductor 3. Conductive paste is coated on an inner peripheral surface of the through hole 14*c*. Conductive paste is further coated on at least one of the bottom surface of the first ceramic sheet 12 and the upper surface 14*d* of the second ceramic sheet 14. In this way, a coated surface having a specified size and pattern is formed. Once the coated surface has dried, the ceramic shaft 16 is fitted into the through hole 14*c* of the second ceramic sheet 14. The ceramic sheets 12 and 14 are laminated, and the laminated body is inserted into an elastic bag. As required, ceramic powder is filled around the laminated body. The laminated body is formed by compression molding using CIP (cold isostatic press), with a pressure of equal to or great than that for the initial compression molding. The joined ceramic sheets 12 and 14 are fired under condition depending on the material. As a result of firing, the coated conductive paste becomes the drawn out-conductor 3 and the sheet electrode 2. The drawn-out conductor 3 and the sheet electrode 2 preferably have a thickness of 2-150 μm. The fired body is machined to specified dimensions by grinding and cutting. In this way, the ceramic block with a built in electrode 1 is made.

Figure 4:
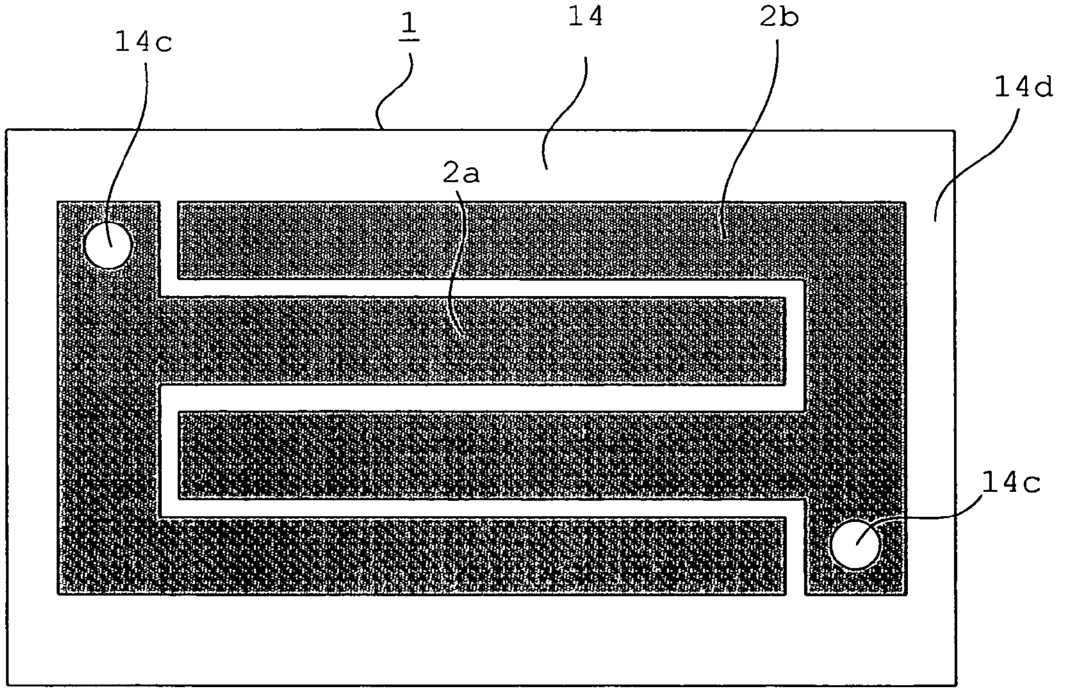
FIG. 4 is a pattern drawing of a printed sheet electrode.

The method of manufacturing an electrostatic chuck applying the present invention will now be described with reference to FIG. 4.

A ceramic that is mainly composed of alumina, a sintering agent such as silica, magnesia or calcia, and a binder such as PVA (polyvinyl alcohol) glycerin or acrylic acid is mixed, and a granular raw material powder is obtained using a spray dryer. The granular raw material powder is filled into rubber, and formed into a rectangular block of about 500×500×100 mm by CIP (cold isostatic press) at a surface pressure of 500 $Kg/cm^2$. Two ceramic sheets of about 200×150×10 mm having a smooth surface are formed by machining the rectangular block. From a similar raw material powder, a ceramic shaft 16 having a diameter of about 5 mm and a length of 10 mm is formed by CIP at a surface pressure of 1000 $kg/cm^2$ and machining. Two through holes 14*c* having a diameter of about 5 mm are formed in one ceramic sheet 14. Using palladium paste, two sheet electrodes 2*a* and 2*b* are screen printed on an upper surface 14*d* of one ceramic sheet 14, as shown in FIG. 4. The palladium paste is coated on an inner surface of the two through holes 14*c* using a brush. The coated surface is dried naturally for one day at room temperature. The other ceramic sheet 12 is overlaid on the upper surface 14*d* of the one ceramic sheet 14, and two ceramic shafts 16 are inserted into the through holes 14*c*. The two ceramic sheets are packed into rubber, and joined using CIP at a surface pressure of 1000 $kg/cm^2$. The joined body is fired at 1450° C. using a furnace with LPG as fuel. If the fired body is cut for observation, a tubular drawn out conductor 3 with a diameter of 4.5 mm and a thickness of about 5 μm is formed at a peripheral wall of the through holes 14*c*. The drawn-out conductor 3 is bonded to the ceramic sheet 14, and no cracks are observed. The fired body is processed with a diamond grindstone so that the thickness of the ceramic sheet 12 is 0.4 mm, and the thickness of the ceramic sheet 14 is 6 mm. Electroless nickel plating is coated at a diameter of 10 mm around the expansion hole 14*b* to a thickness of 5-10 μm, and a metal electrode connecting to the external electrode is attached to the expansion hole 14*b*. In this way, the electrostatic chuck platform is manufactured. If a voltage of ±5 KV is applied to the sheet electrode 2, it is possible to strongly bond a glass substrate with an ITO film while keeping sufficient mechanical strength of the electrostatic chuck platform.

While the embodiments have been chosen in order to explain the principles of the invention and its practical applications, many modifications are possible in light of the above teaching. It is intended that the scope of the invention be defined by the claims appended hereto.

The invention claimed is:

1. A ceramic block with a built in electrode comprising:

a first insulating ceramic sheet having a bearing surface;

a sheet electrode having an inner edge and spreading out generally parallel to the bearing surface;

a second insulating ceramic sheet enclosing the sheet electrode together with the first insulating ceramic sheet;

a drawn out conductor for supplying voltage to the sheet electrode, the drawn out conductor extending through the second insulating ceramic sheet and being connected to the inner edge of the sheet electrode, the second insulating ceramic sheet having a through hole through which the drawn out conductor passes; and an insulating ceramic shaft fitted into the through hole.

2. The ceramic block with a built in electrode of claim 1, wherein the drawn out conductor is a thin film.

3. The ceramic block with a built in electrode of claim 2, wherein the drawn out conductor has a thickness of 2-150 μm.

4. The ceramic block with a built in electrode of claim 1, wherein the drawn out conductor is tubular.

5. The ceramic block with a built in electrode of claim 4, wherein the drawn out conductor is cylindrical.

6. The ceramic block with a built in electrode of claim 1, wherein the drawn out conductor is connected to the sheet electrode so as to form a perpendicular corner.

7. The ceramic block with a built in electrode of claim 1, wherein the drawn out conductor is attached to an inner wall of the through hole.

8. The ceramic block with a built in electrode of claim 1, wherein the inner edge of the sheet electrode is formed along the opening of the through hole.

9. A method of manufacturing a ceramic block with a built in electrode comprising the steps of:

forming a first insulating ceramic sheet having a bearing surface;

forming a second insulating ceramic sheet having a through hole;

forming a sheet electrode, on the surface of at least one of the first and second insulating ceramic sheet and spreading generally parallel to the bearing surface;

forming a drawn out conductor on an inner wall of the through hole;

forming a laminated body of the first and second insulating ceramic sheets; and firing the laminated body of the first and second insulating ceramic sheets.

10. The method of manufacturing a ceramic block with a built in electrode of claim 9, further comprising a step of fitting an insulating ceramic shaft into the through hole.

11. The method of manufacturing a ceramic block with a built in electrode of claim 10, wherein the insulating ceramic shaft is made from the same material as the first and second insulating ceramic sheets.

12. The method of manufacturing a ceramic block with a built in electrode of claim 9, wherein the step of forming a sheet electrode includes a step of coating a conductive paste.

13. The method of manufacturing a ceramic block with a built in electrode of claim 9, wherein the step of forming a drawn out conductor includes a step of coating a conductive paste.

14. The method of manufacturing a ceramic block with a built in electrode of claim 13, wherein the step of forming a drawn out conductor includes a step of drying a conductive paste.

15. The method of manufacturing a ceramic block with a built in electrode of claim 14, further comprising a step of fitting a ceramic shaft into the through hole after the step of drying a conductive paste.

16. The method of manufacturing a ceramic block with a built in electrode of claim 9, wherein the sheet electrode has a thickness of 2-150 μm.

17. The method of manufacturing a ceramic block with a built in electrode of claim 9, wherein the drawn out conductor has a thickness of 2-150 μm.

18. The method of manufacturing a ceramic block with a built in electrode of claim 9, wherein cold isostatic press is used in the step of forming a laminated body.

* * * * *